(12) United States Patent
Cheng et al.

(10) Patent No.: US 8,967,561 B2
(45) Date of Patent: Mar. 3, 2015

(54) HOLDER FOR ELECTRONIC DEVICE

(75) Inventors: Quan-Chang Cheng, Shenzhen (CN); Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 362 days.

(21) Appl. No.: 13/272,263

(22) Filed: Oct. 13, 2011

(65) Prior Publication Data

US 2012/0168581 A1 Jul. 5, 2012

(30) Foreign Application Priority Data

Dec. 30, 2010 (CN) .......................... 2010 1 0314781

(51) Int. Cl.
*A45D 42/14* (2006.01)

(52) U.S. Cl.
USPC .................. 248/206.2; 248/176.1; 248/205.5; 248/309.1; 248/918

(58) Field of Classification Search
USPC ........... 248/206.2, 205.5, 553, 309.1, 229.12, 248/176.1, 18; 379/446
See application file for complete search history.

(56) References Cited

U.S. PATENT DOCUMENTS

| | | | | |
|---|---|---|---|---|
| 5,982,885 A * | 11/1999 | Ho | ................................ | 379/446 |
| 7,551,458 B2 * | 6/2009 | Carnevali | ...................... | 361/807 |
| 7,669,829 B2 * | 3/2010 | Ogatsu | ........................... | 248/682 |
| 7,828,259 B2 * | 11/2010 | Wang et al. | ............... | 248/316.4 |
| 8,091,843 B2 * | 1/2012 | Tsai | ........................... | 248/206.2 |
| 8,191,851 B2 * | 6/2012 | Crown | ......................... | 248/553 |
| 2004/0254002 A1 * | 12/2004 | Tsay | ........................ | 455/575.9 |

* cited by examiner

*Primary Examiner* — Amy J. Sterling
(74) *Attorney, Agent, or Firm* — Novak Druce Connolly Bove + Quigg LLP

(57) ABSTRACT

A holder is provided for holding an electronic device on a supporting surface. The holder includes a main body, an attaching member, and a connection arm. The main body includes a support member for supporting the electronic device and a restricting mechanism movably connected to the support member for stably keeping the electronic device in the support member. The attaching member is used for attaching the main body to the supporting surface. Two opposite ends of the connection arm are respectively rotatably coupled to the attaching member and the main body to allow the viewing angle of the electronic device being adjusted.

11 Claims, 7 Drawing Sheets

HOLDER FOR ELECTRONIC DEVICE

BACKGROUND

1. Technical Field

The present disclosure relates to holders, and particularly to a holder for holding an electronic device.

2. Description of Related Art

Hand-held electronic devices, such as mobile phones or personal digital assistances, are ubiquitous. A user often needs to hold the electronic device with one hand and operate the electronic device with the other hand, and having both hands occupied may be an inconvenience for some users especially when driving.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
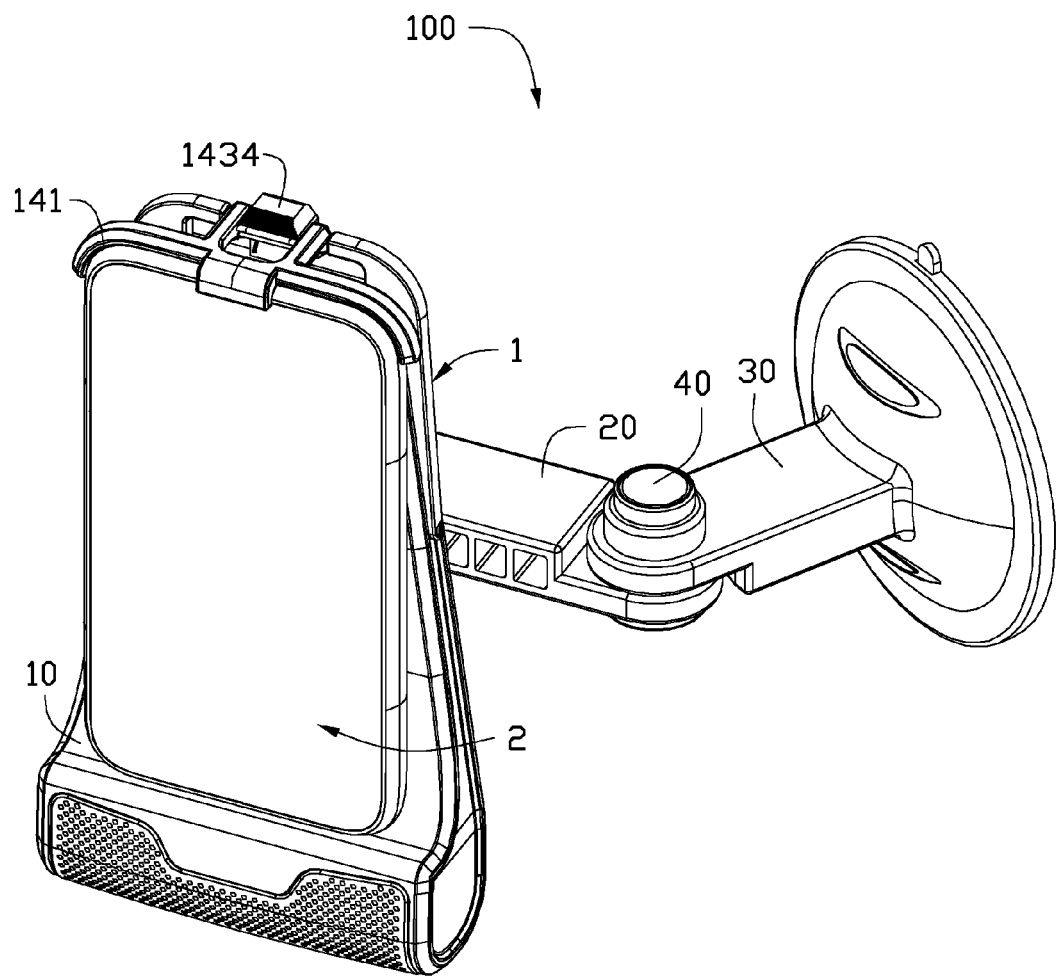
FIG. 1 is an isometric view of a holder connected to an electronic device.

Referring to FIG. 1, an apparatus 100 includes an electronic device 2 and a holder 1 for holding the electronic device 2. The electronic device 2 may be a hand-held electronic device such as a tablet computer, a mobile phone, or a music player. In the embodiment, the electronic device 2 is a mobile phone with a socket (not shown) defined at a bottom portion thereof.

The holder 1 includes a main body 10, a connection arm 20, an attaching member 30, and two rotating shafts 40. The main body 10 is configured for supporting and holding the electronic device 2. The attaching member 30 is used for attaching the holder 1 to a supporting surface. The main body 10 is rotatably coupled to one end of the connection arm 20 via one of the rotating shafts 40 (FIG. 3), and the attaching member 30 is rotatably coupled to the other end of the connection arm 20 via the other rotating shaft 40. Each rotating shaft 40 is capable of changing from a first position to a second position to allow the rotation of the connection arm 20 relative to the main body 10 and the attaching member 30, such that the viewing angle of the electronic device 2 can be adjusted.

Figure 2:
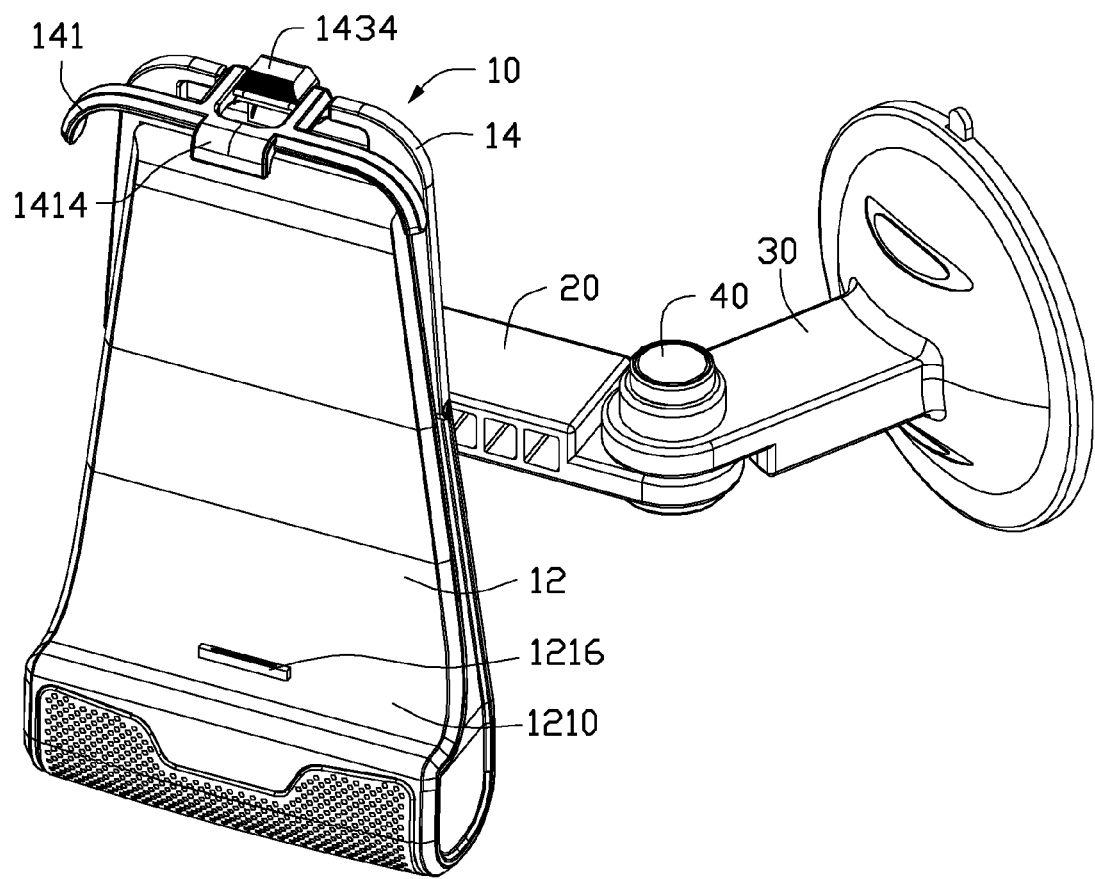
FIG. 2 is an isometric view showing the holder of FIG. 1 in a first state of use; the holder includes a rotating shaft.
Figure 3:
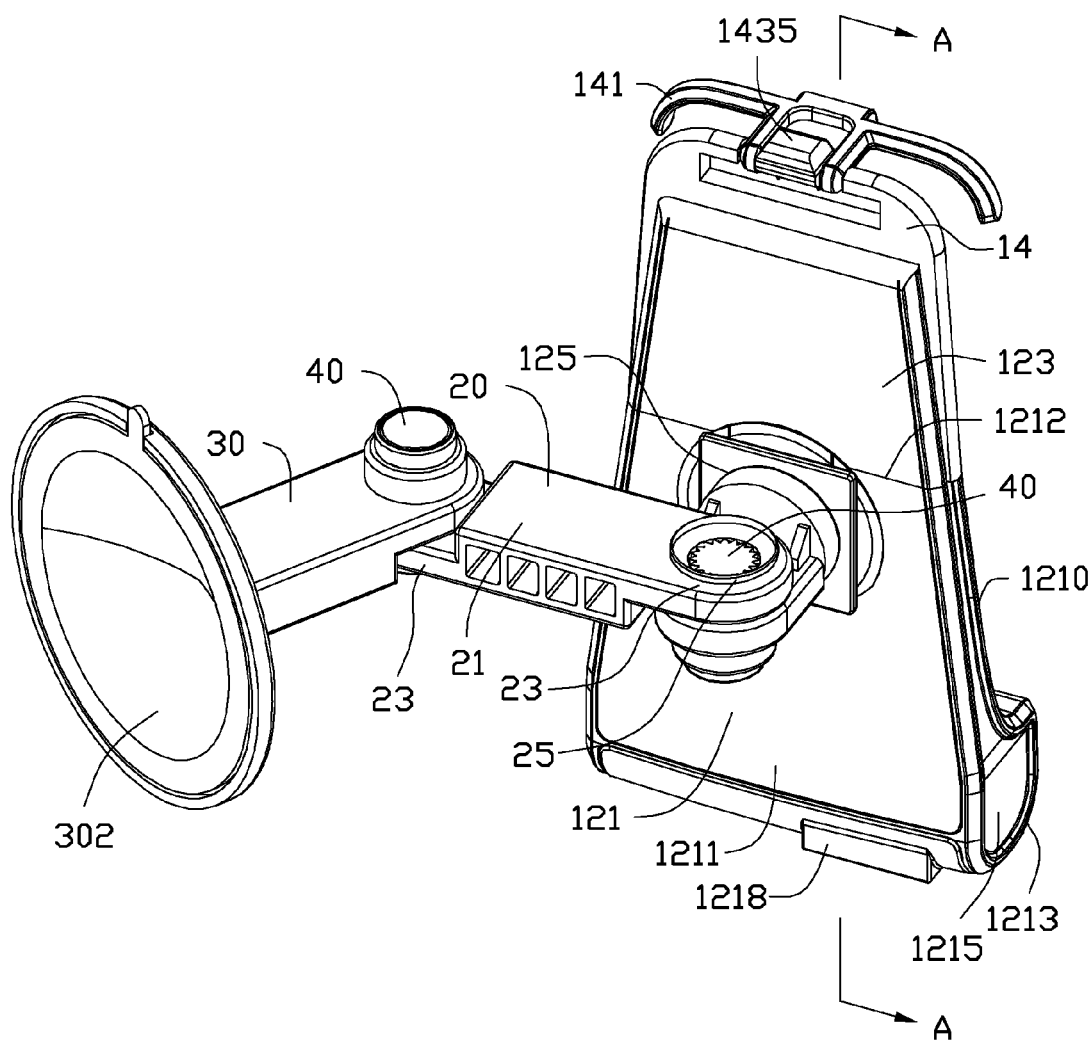
FIG. 3 is similar to FIG. 2, but viewed from the other side.

Referring to FIGS. 2 and 3, the main body 10 includes a support member 12 for supporting the electronic device 2 and a restricting mechanism 14 connected to the support member 12 and used for holding the electronic device 2 in a fixed manner to the support member 12. The support member 12 includes a first support member 121, a second support member 123 connected to the first support member 121, and a connection member 125 disposed on one side of the first support member 121. The first support member 121 includes four side walls 1210, 1211, 1212, and 1213 all of which define a chamber 1215 for receiving electronic components such as a speaker assembly 127 and a power adaptor 128 (see FIG. 5). The side wall 1210 is curved to provide support for the bottom portion of the electronic device 2, such that the electronic device 2 can stand upright in the support member 12. The side wall 1210 defines a first connector 1216 and the side wall 1213 defines a second connector 1218. The first connector 1216 is capable of engaging with the socket of the electronic device 2 to allow the output of audio data from the electronic device 2 to the speaker assembly 127. The second connector 1218 is connected to the power adaptor 128 and capable of being connected to a power source, such that the electronic device 2 can be charged and/or recharged. The side wall 1212 defines two receiving portions 1219 (see FIG. 4).

Figure 4:
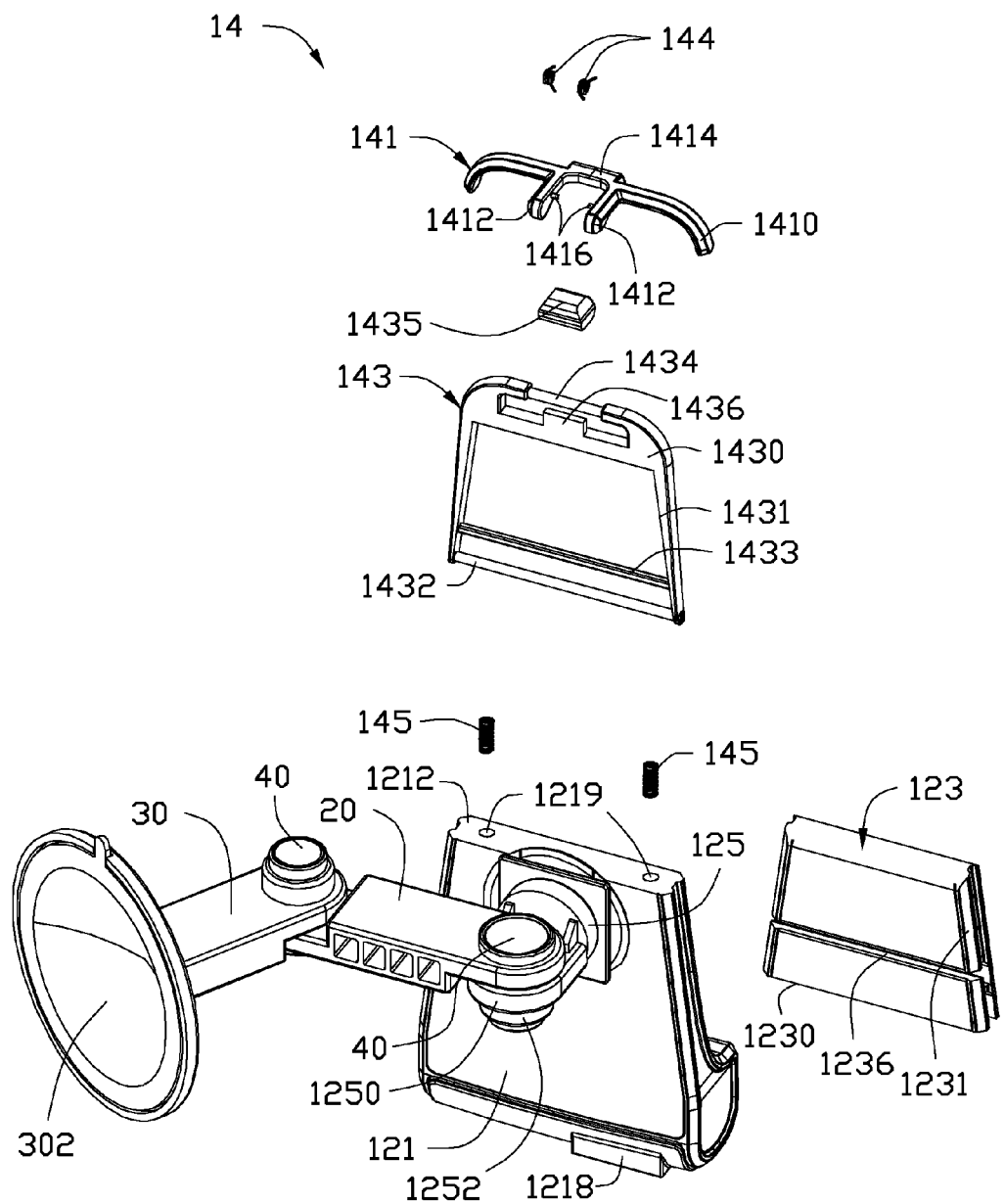
FIG. 4 is an exploded view of the holder of FIG. 3.
Figure 5:
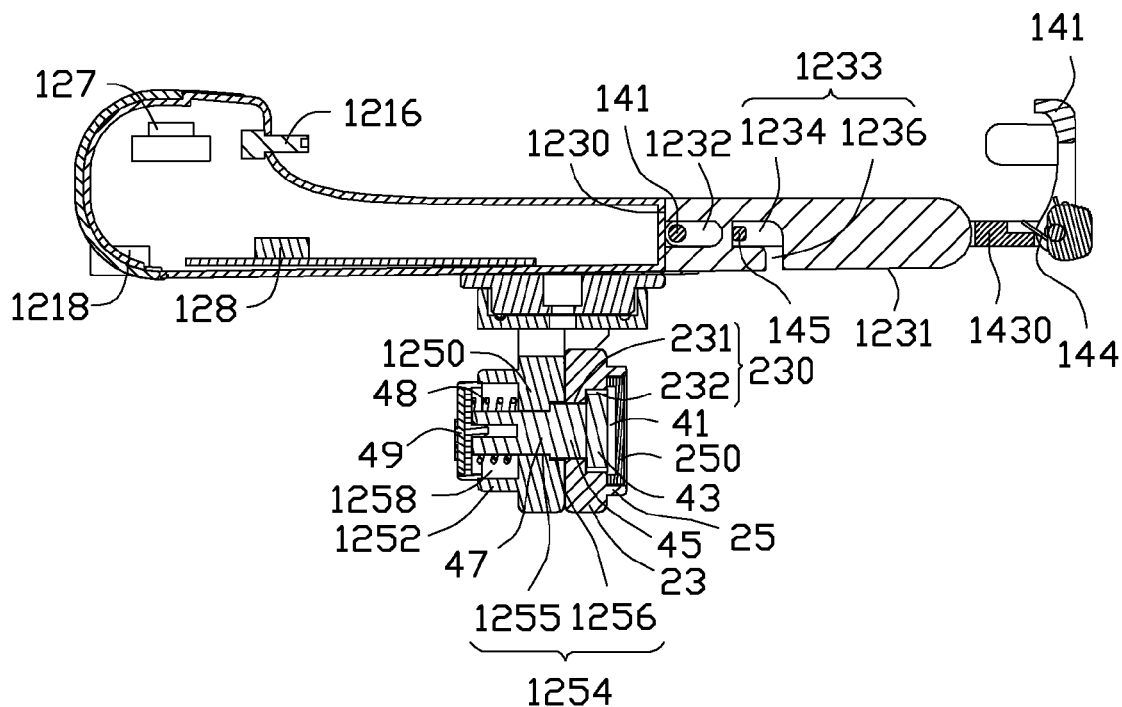
FIG. 5 is a cross-sectional view of the holder of FIG. 3 taken along line A-A.

Referring to FIG. 4, the second support member 123 is connected to the side wall 1212. The second support member 123 includes a first side portion 1230 corresponding to the side wall 1212 and a second side portion 1231 substantially perpendicularly connected to the side portion 1230. Referring also to FIG. 5, the side portion 1230 defines a first sliding slot 1232 and the second side portion 1231 defines a second sliding slot 1233. In the illustrated embodiment, the first sliding slot 1232 is perpendicular to the first side portion 1230. The second sliding slot 1233 has two axes, having a first slot portion 1234 extending in a direction perpendicular to the side portion 1230 and a second slot portion 1236 extending in a direction perpendicular to the second side portion 1231. The second slot portion 1236 is open at the second side portion 1231.

The connection member 125 protrudes from the side wall 1211, and includes a free end 1250 away from the side wall 1211 and a cylindrical first holding portion 1252 protruding from one side of the free end 1250. As shown in FIG. 5, the free end 1250 defines a fixing hole 1254, the first holding portion 1252 defines a first receiving groove 1258 communicating with the fixing hole 1254. The fixing hole 1254 includes a first fixing hole portion 1255 communicating with the first receiving groove 1258 and a second fixing hole portion 1256 communicating with the first fixing hole portion 1255. The first fixing hole portion 1255 is substantially rectangular and the second fixing hole portion 1256 is substantially circular.

The restricting mechanism 14 includes a clasping member 141 for holding the electronic device 2 in the support member 12, a sliding member 143 slidably connected to the second support member 123, two first elastic members 144 disposed between the clasping member 141 and the sliding member 143, and two second elastic members 145 disposed between the sliding member 143 and the second support member 123.

Referring again to FIG. 4, the clasping member 141 is substantially a shallow U shape, and includes a first clasping arm 1410, two spaced second clasping arms 1412, and a first operating portion 1414. The shape of the first clasping arm 1410 is suited for abutting the top portion of the electronic device 2. The two second clasping arms 1412 protrude from the middle portion of one side of the first clasping arm 1410, and the first operating portion 1414 protrudes from the middle portion of the other side of the first clasping arm 1410. Two cylindrical abutting portions 1416 respectively protrude from the inner surface of the corresponding second clasping arm 1412 and face each other.

The sliding member 143 includes a main part 1430, two side arms 1431 protruding from two opposite ends of the main part 1430, a first sliding shaft 1432 and a second sliding shaft

1433. The main part 1430 includes a connection rod 1434, a second operating portion 1435, and a protrusion 1436. The connection rod 1434 passes through a through hole (not shown) defined in each of the second clasping arms 1412, as such, the clasping member 141 is rotatable relative to the sliding member 143. The second operating portion 1435 is fixed to the connection rod 1434. The protrusion 1436 is located under the connection rod 1434. The ends of the first sliding shaft 1432 are secured to the ends of the two side arms 1431 away from the main part 1430. The ends of the second sliding shaft 1433 are secured to the side arms 1431. The second sliding shaft 1433 is parallel to the first sliding shaft 1432 and is sandwiched between the first sliding shaft 1432 and the main part 1430. The first sliding shaft 1432 fits the first sliding slot 1232 and may slide in it. The second sliding shaft 1433 fits the second sliding slot 1233 and may slide in it. The cross section of the first sliding shaft 1432 is substantially circular and the cross section of the second sliding shaft 1433 is substantially rectangular. In cross section, the width of the second sliding shaft 1433 is substantially equal to that of the second sliding slot 1233 so as to clamp the second sliding shaft 1433 therein.

One end of each first elastic member 144 abuts the protrusion 1436, and the other end thereof abuts the corresponding abutting portion 1416 for creating or increasing spring tension when the clasping member 141 is rotated relative to the main part 1430. One end of each of the second elastic members 145 is connected to the distal end of the corresponding side arm 1431 which is adjacent to the first sliding shaft 1432 and the other end thereof is fixed in the corresponding receiving portion 1219 for creating or increasing spring tension when the main part 1430 is moved relative to the support member 12.

Referring to FIGS. 3 and 5, the connection arm 20 includes a middle portion 21, two end portions 23, and a cylindrical second holding portion 25 protruding from each of the end portions 23. As shown in FIG. 5, each end portion 23 defines an engaging hole 230 and each second holding portion 25 defines a second receiving groove 250 communicating with the engaging hole 230. The engaging hole 230 corresponds to the fixing hole 1254, and includes a first engaging hole portion 231 and a second engaging hole portion 232. The first engaging hole portion 231 is substantially circular and equal in diameter to the second fixing hole portion 1256 of the fixing hole 1254. The second engaging hole portion 232 is larger than the first engaging hole portion 231 and a number of notches (not shown) are defined in the inner wall thereof.

Figure 7:
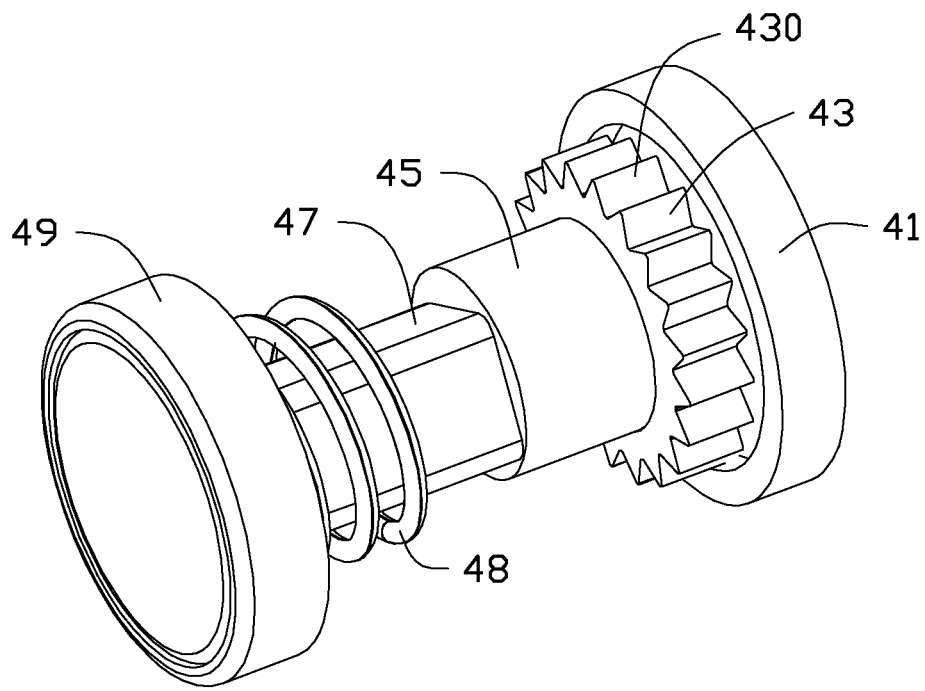
FIG. 7 is an isometric view of the rotating shaft of the holder of FIG. 2.

Referring to FIG. 7, each rotating shaft 40 includes the following concentric components, in order from the top to the bottom: a first cover 41, a gear 43, a first body portion 45, a second body portion 47, a third elastic member 48 and a second cover 49. The second cover 49 is secured to the bottom end of the second body portion 47. The first cover 41 is received in the second holding portion 25. The gear 43 corresponds to and is slidably received in the second engaging hole portion 232. The first body portion 45 corresponds to the second fixing hole portion 1256 and the first engaging hole portion 231. The second body portion 47 corresponds to the first fixing hole portion 1255 and the first holding portion 1252. The third elastic member 48 is sleeved on the second body portion 47, the second cover 49 corresponds to and is received in the first holding portion 1252. The gear 43 includes a number of teeth 430 to engage with the notches defined in the second engaging hole portion 232.

In the illustrated embodiment, the means of connection between the connection arm 20 and the connection member 125 is the same as that for the connection arm 20 and the attaching member 30, and is as follows.

In assembly, the connection arm 20 is connected to the connection member 125. One end portion 23 of the connection arm 20 and the free end 1250 of the connection member 125 are placed together, with the fixing hole 1254 aligned with the engaging hole 230. The rotating shaft 40 is inserted into the fixing hole 1254 and the engaging hole 230 in that order. The first cover 41 is received in the second holding portion 25, the gear 43 engages in the hole portion 232, the first body portion 45 is partly received in the first engaging hole portion 231 and partly received in the second fixing hole portion 1256, the second body portion 47 is partly received in the first fixing hole portion 1255 and partly received in the first holding portion 1252, with the second cover 49 extending in the first holding portion 1252. In this state, the inner end of each third elastic member 48 abuts the free end 1250.

When the electronic device 2 is to be held in the holder 1, the clasping member 141 is pulled up against spring tension of the second elastic members 145 to allow the electronic device 2 to be placed in the holder 1. The first clasping arm 1410 presses against the top of the electronic device 2, and the electronic device 2 is thus securely held in the support member 12.

Figure 6:
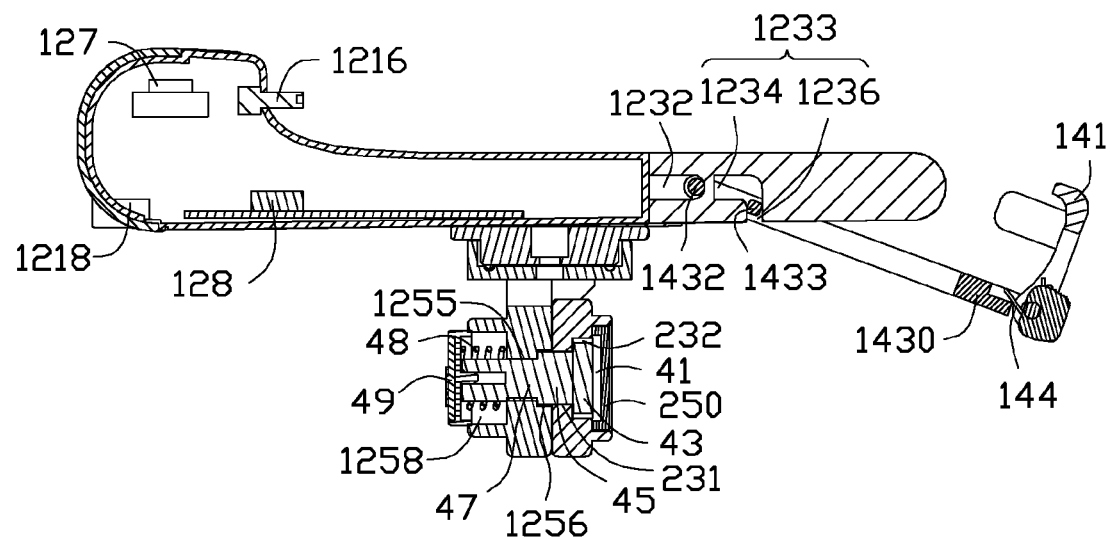
FIG. 6 is a cross-sectional view showing the holder of FIG. 1 in a second state of use.

Furthermore, the distance between the clasping member 141 and the second support member 123 can be adjusted to allow electronic devices of different lengths to be held in the holder 1. Referring to FIG. 6, a small pulling force can draw the clasping member 141 and the sliding member 143 upwards in a direction perpendicular to the first side portion 1230. At this time, the first sliding shaft 1432 is slid to the end of the first sliding slot 1232 away from the first side portion 1230, the second sliding shaft 1433 is slid to the end of the first slot portion 1234 adjacent to the second slot portion 1236, and the second elastic members 145 are elastically elongated. Thus, the length of the main body 10 is in effect adjustable to allow electronic devices of different lengths to be held in the holder 1. Further, the sliding member 143 can be rotated to drive the second sliding shaft 1433 to move into the second slot portion 1236. Since the second sliding shaft 1433 is substantially rectangular and the cross section thereof is substantially equal to the second sliding slot 1233, moving the second sliding shaft 1433 into the second slot portion 1236 will cause it to be clamped in the second slot portion 1236, as shown in FIG. 6. Thus, the sliding member 143 is restricted from further rotating relative to the support member 12 and is kept in an open position to allow the user to place an electronic device 2 in the holder 1 without adjusting the sliding member 143.

After the electronic device 2 is placed in the holder 1, the sliding member 143 can be rotated to a position substantially parallel to the second support member 123. When the member 143 is released from rotation, the second elastic members 145 rebound to drive the restricting mechanism 14 to slide toward the first support member 121, whereby the electronic device 2 is held more firmly in the holder 1.

When the gear 43 is received in the second engaging hole portion 232 with the teeth 430 thereof meshing with the notches of the second engaging hole portion 232, the rotating shaft 40 is located in the first position, and is prevented from rotating. Thus, the connection arm 20 is prevented from rotating relative to the connection member 125. In this state, the viewing angle of the electronic device 2 cannot be adjusted.

When the second cover 49 is pressed in against spring pressure of the third elastic member 48, the gear 43 of the rotating shaft 40 slides out of engagement with the connection arm 20. The rotating shaft 40 is located in a second position where it can freely rotate in the engaging hole 230 and the fixing hole 1254. Then, the main body 10 may be rotated relative to the connection arm 20 and the attaching member 30 and the viewing angle of the electronic device 2 may be adjusted. The second cover 49 returns to its original position, and the gear 43 re-engages, when the second cover 49 is released, by virtue of spring pressure of the third elastic member 43.

The attaching member 30 in some embodiments includes a suction cup 302 for maintaining contact with a supporting surface.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. A holder used for attaching an electronic device to a supporting surface, comprising:
   a main body comprising a support member for supporting the electronic device and a restricting mechanism movably connected to the support member for stably keeping the electronic device in the support member;
   an attaching member for attaching the main body to the supporting surface; and
   a connection arm with opposite ends rotatably coupled to the attaching member and the main body respectively to allow the viewing angle of the electronic device to be adjusted;
   wherein the restricting mechanism comprises a sliding member slidably connected to the support member to elongate a length of the main body such that electronic devices of different lengths can be held in the holder, the support member defines a first sliding slot extending along a first direction, the sliding member comprises a first sliding shaft slidably received in the first sliding slot and perpendicular to the first sliding slot, the first sliding shaft is configured to slide in the first sliding slot along a direction perpendicular to the first sliding shaft to elongate the length of the main body; and
   wherein the sliding member is further capable of rotating relative to the support member and maintaining an open position in which an angle is formed between the support member and the sliding member, the support member further defines a second sliding slot spaced away from the first sliding slot along the first direction, the second sliding slot comprises a first slot portion substantially parallel to the first sliding slot and a second slot portion communicating with the first slot portion and substantially perpendicular to the first slot portion, the sliding member further comprises a second sliding shaft capable of sliding in the first slot portion to be clamped in the second slot portion.

2. The holder as claimed in claim 1, wherein at least one elastic member is arranged between the support member and the sliding member to drive the sliding member back to its original position.

3. The holder as claimed in claim 1, wherein the support member further comprises a clasping member rotatably connected to the sliding member to allow the electronic device to be held in the holder, the clasping member is capable of abutting the electronic device after the electronic device is held in the holder.

4. The holder as claimed in claim 3, wherein the clasping member comprises a first clasping arm extending above the support member for abutting a side portion of the electronic device and two second clasping arms protruding from the first clasping arm, the sliding member further comprises a connection rod rotatably connected to the second clasping arms to allow the first clasping arm to disengage with the electronic device.

5. The holder as claimed in claim 4, wherein the restricting mechanism further comprises at least one second elastic member, two ends of the at least one second elastic member respectively abut the clasping member and the sliding member to drive the clasping member back to its original position.

6. The holder as claimed in claim 1, wherein the holder further comprises a first rotating shaft operatively rotatably connecting the main body and the connection arm to allow the main body to rotate relative to the connection arm.

7. The holder as claimed in claim 6, wherein the first rotating shaft comprises a body portion capable of being slidably inserted in the main body and the connection arm to interchange between a first position and a second position, the first rotating shaft is clamped to the connection arm and the main body to restrict the connection arm from rotating relative to the main body in the first position, and the first rotating shaft is unclamped to the connection arm to allow the connection arm to rotate relative to the main body in the second position.

8. The holder as claimed in claim 7, wherein the first rotating shaft comprises a gear meshing with the main body when the first rotating shaft is in the first position.

9. The holder as claimed in claim 7, wherein one end of the body portion is capable of extending out of the main body, the first rotating shaft further comprises a third elastic member sleeved on the end of the body portion extending out of the main body for driving the body portion to slide to the first position from the second position.

10. The holder as claimed in claim 6, wherein the holder further comprises a second rotating shaft for rotatably connecting the attaching member to the other end of the connection arm opposite to the main body.

11. The holder as claimed in claim 1, wherein the attaching member comprises a suction cup for being attached to the supporting surface when the holder is attached to the supporting surface.

* * * * *